United States Patent
Schultz et al.

(10) Patent No.: US 7,512,720 B2
(45) Date of Patent: Mar. 31, 2009

(54) SYSTEM AND METHOD FOR ACCESSING UNIVERSAL SERIAL BUS NETWORKS

(75) Inventors: Russell Alvin Schultz, Austin, TX (US); Jean-Charles Pina, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 195 days.

(21) Appl. No.: 11/118,150

(22) Filed: Apr. 29, 2005

(65) Prior Publication Data

US 2006/0248174 A1   Nov. 2, 2006

(51) Int. Cl.
   G06F 3/00   (2006.01)
(52) U.S. Cl. .......................... 710/14; 713/320
(58) Field of Classification Search ................ 713/300, 713/320, 323, 324; 710/8, 10, 14
   See application file for complete search history.

(56) References Cited

U.S. PATENT DOCUMENTS

| | | | |
|---|---|---|---|
| 6,012,103 A | 1/2000 | Sartore et al. | |
| 6,105,097 A | 8/2000 | Larky et al. | |
| 6,178,514 B1 | 1/2001 | Wood | |
| 6,665,801 B1 | 12/2003 | Weiss | |
| 6,671,831 B1 | 12/2003 | Sartore et al. | |
| 6,782,491 B1* | 8/2004 | Foedlmeier et al. | 714/37 |
| 6,912,651 B1* | 6/2005 | Hamdi et al. | 713/1 |
| 6,933,936 B1 | 8/2005 | Hirai | |
| 7,058,827 B2 | 6/2006 | Rose et al. | |
| 7,069,347 B1* | 6/2006 | Kolokowsky | 710/8 |
| 7,072,989 B1 | 7/2006 | Kolokowsky et al. | |
| 7,254,728 B2 | 8/2007 | Rose et al. | |
| 7,386,742 B2 | 6/2008 | Hirai | |
| 2002/0162036 A1 | 10/2002 | Kim et al. | |
| 2004/0073847 A1 | 4/2004 | Booth | |
| 2004/0078498 A1* | 4/2004 | Saotome | 710/8 |
| 2004/0088449 A1* | 5/2004 | Sakaki | 710/15 |
| 2004/0103223 A1 | 5/2004 | Gahehart et al. | |
| 2004/0215982 A1 | 10/2004 | Subramanian et al. | |
| 2005/0091549 A1 | 4/2005 | Wu et al. | |
| 2005/0160196 A1* | 7/2005 | Dutton et al. | 710/10 |
| 2006/0117195 A1* | 6/2006 | Niwa et al. | 713/300 |

FOREIGN PATENT DOCUMENTS

WO   WO 02/065264 A1   8/2002

OTHER PUBLICATIONS

Kevin Lynn, "Universal Serial Bus (USB) Power Management," IEEE WESCON/97, 1997, pp. 434-441.

* cited by examiner

*Primary Examiner*—Clifford H Knoll
(74) *Attorney, Agent, or Firm*—Toler Law Group

(57) ABSTRACT

The disclosure is directed to a computational device including functional circuitry, a transceiver interface that is accessible to the functional circuitry, and a universal serial bus transceiver that is accessible to the transceiver interface and that is configured to couple to a universal serial bus compatible media. The transceiver interface is configured to provide a first set of configuration data including a first power setting to a host device via the universal serial bus transceiver. The universal serial bus transceiver is configured to electrically disconnect from and electrically reconnect to the universal serial bus media in response to a suspension signal. The transceiver interface is also configured to provide a second set of configuration data including a second power setting after electrically reconnecting.

15 Claims, 1 Drawing Sheet

SYSTEM AND METHOD FOR ACCESSING UNIVERSAL SERIAL BUS NETWORKS

FIELD OF THE DISCLOSURE

This disclosure, in general, relates to systems and methods for accessing universal serial bus networks.

BACKGROUND

The universal serial bus (USB) has become a common data and communication link for digital computational systems. USB ports have been integrated into general purpose devices, such as personal computers (PCs), peripheral devices, such as printers, embedded systems, such as portable audio and video players, storage devices, such as external and portable hard drives and external flash memory, input devices, such as keyboards and data gathering devices, and network devices. Typically, USB permits a host device, often a PC, to connect with client devices, such as peripheral devices, storage devices, and network devices. The universal serial bus also permits a hub device to couple to the host and to several client devices. Often, hub devices provide four or more universal serial bus (USB) ports for attaching other client devices and permitting communication with the host device. Typically, a hub device permits a single universal serial bus output from a host device to access one or more client devices.

When a client device is attached to a USB network, either through a hub device or directly to the host device, the client device causes a characteristic change in voltage within the connecting circuitry that indicates the presence of the client device. The host device sends a request for configuration data to an attached USB device, either directly or via a hub device. In the case of a direct connection, the host device sends a request to the client device, which in turn provides configuration data to the host device. Alternatively, the host device sends a request to a hub device. The hub device indicates the presence of a peripheral device attached to the hub device and the host sends a request for configuration data to the peripheral device via the hub device.

In response, the client device forwards configuration data to the host device. The configuration data typically includes a parameter associated with a power setting. Based on the universal serial bus specification, the client device may draw a maximum of 100 ma at start up and connection. However the client device, through the configuration data, may request additional power, up to 500 ma. The host device is constrained by the USB standard to a maximum power output via the universal serial bus. As such, the host device may decide, based on the configuration data, whether to allow the client device to connect to a network. For example, when other client devices are drawing power from the network and when the additional power requested by the connecting client device would cause the total power consumption to exceed the permissible maximum, the host device may prevent the connecting device from connecting to the network. When a particular client device is denied access to the network, the host device issues a suspend signal, limiting the client device's access to the network and to power. Typically, the client device is permitted to use 500 microamps (μa) of power when in the suspended mode.

In some embodiments, USB client devices may provide more than one configuration to the host device. The configurations may be provided in a configuration descriptor that specifies the number of configurations and provides the configurations. However, different operating systems selectively treat these additional configurations in different manners. For example, Macintosh® operating systems typically select the lowest power configuration. In an alternative example, Windows® operating systems typically select the first configuration. For devices that provide different functionality based on the available power, selection of the configuration influences the capabilities and operations of the client device. As such, manufacturers of client devices have limited control over client device performance when attached to the various host devices available in the market place. Therefore, an improved method of selecting a universal serial bus configuration would be desirable.

BRIEF DESCRIPTION OF THE DRAWINGS

The present disclosure may be better understood, and its numerous features and advantages made apparent to those skilled in the art by referencing the accompanying drawings.

DESCRIPTION OF THE DRAWING(S)

Figure 1:
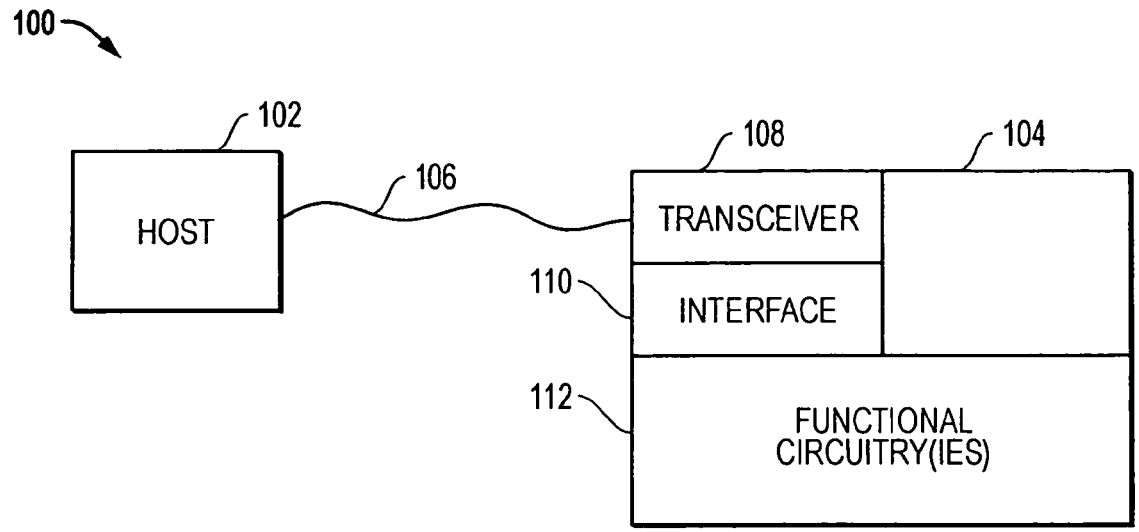
FIG. 1 includes an illustration of an exemplary embodiment of a computational system.

In one particular embodiment, the disclosure is directed to a computational device, such as a universal serial bus (USB) client device. The computational device includes functional circuitry, a transceiver interface accessible to the functional circuitry and a universal serial bus transceiver accessible to the transceiver interface. The USB transceiver is configured to couple to a USB media, such as a USB compatible cable or USB plug. The transceiver interface is configured to provide a first set of configuration data including a first power setting to a host device via the USB transceiver. The universal serial bus transceiver is configured to electrically disconnect from and electrically reconnect to the USB media in response to a suspension signal sent from a host device. The transceiver interface is configured to provide a second set of configuration data including a second power setting based on electrically reconnecting. The computational device may be included in a computational system in which a host device having a host side USB interface is connected to a USB media connected to the client device.

In another exemplary embodiment, the disclosure is directed to a method of establishing a connection between a client device and a host device via a USB connection. The client device includes a USB transceiver coupled to a USB compatible media coupled to the host device. The method includes providing a first set of configuration data to the host device via the USB transceiver. The first set of configuration data includes a parameter having a first parameter value. The method further includes receiving a suspension signal from the host device and electrically disconnecting the USB transceiver in response to the suspension signal from the host device. The method may also include electrically connecting to the USB connection after electrically disconnecting and providing a second set of configuration data to the host device. The second set of configuration data includes the parameter having a second parameter value. In one particular embodiment, the parameter is associated with a power setting.

In one particular embodiment, the disclosure is directed to a computational device including functional circuitry, a transceiver interface that is accessible to the functional circuitry, and a universal serial bus transceiver that is accessible to the transceiver interface and that is configured to couple to a universal serial bus compatible media. The transceiver interface is configured to provide a first set of configuration data including a first power setting to a host device. The universal serial bus transceiver is configured to electrically disconnect from and electrically reconnect to the universal serial bus media. The transceiver interface is further configured to provide a second set of configuration data including a second power setting in response to electrically reconnecting.

In another exemplary embodiment, the disclosure is directed to a method of establishing a connection from a client device to a host device via a universal serial bus connection. The client device includes a universal serial bus transceiver coupled to a universal serial bus compatible media. The method includes providing a first set of configuration data to the host device via the universal serial bus transceiver. The first set of configuration data includes a parameter having a first parameter value. The method further includes receiving a suspension signal at the universal serial bus transceiver and electrically disconnecting the universal serial bus transceiver from the universal serial bus connection in response to the suspension signal.

In a further exemplary embodiment, the disclosure is directed to a system including a host device having a host-side universal serial bus port, a universal serial bus compatible media connected to the host-side universal serial bus port, and a client device. The client device includes functional circuitry, a transceiver interface that is accessible to the functional circuitry, and a universal serial bus transceiver that is accessible to the transceiver interface and that is configured to couple to a universal serial bus compatible media. The transceiver interface is configured to provide a first set of configuration data including a first power setting to the host device via the universal serial bus transceiver. The universal serial bus transceiver is configured to electrically disconnect from and electrically reconnect to the universal serial bus compatible media in response to a suspension signal sent from the host device.

FIG. 1 includes an illustration of an exemplary embodiment of a computational system 100. The computational system 100 includes a host device 102 connected to a client device 104 via a USB compatible media 106, such as a USB compatible cable. Alternatively, the host device 102 may be communicatively coupled to the client device 104 via one or more hub devices (not shown).

The client device 104 includes one or more functional circuitry 112, the functional circuitry 112 access an interface 110 to communicate via a transceiver 108 using USB specific communications. The functional circuitry 112 may be formed of various hardware and software components configured to provide a desired functionality of the device. For example, the client device 104 may include one or more functional circuitry 112 to provide functions such as data storage, data output, data input, network access, and combinations thereof. For example, the client device 104 may include functional circuitry 112, such as a hard drive or flash memory that act to store data. In another exemplary embodiment, the functional circuitry 112 may provide wired or wireless network access, such as through a modem or wireless network card. In particular embodiments, the wireless network card may be configured to access wireless networks utilizing a network standard, such as Institute of Electrical and Electronics Engineers (IEEE) 802.11, IEEE 802.15, or IEEE 802.16. Alternatively, modems may be provided for accessing Ethernet and Internet protocol (IP) based networks. In a further exemplary embodiment, the functional circuitry 112 may form an output device, such as a printer. In another exemplary embodiment, the functional circuitry 112 may form a portable audio device or portable video device.

In one particular embodiment, the functional circuitry 112 may be configurable to operate in one or more modes. Each of the one or more modes may have a particular power consumption profile and may provide different levels of functionality. For example, in a high power consumption mode, the functional circuitry 112 may provide one or more features. However, in a low power consumption mode, the functional circuitry 112 may provide fewer features. For example, a wireless access circuitry may operate in a high powered mode or in a low powered mode. The high powered mode may provide access to network access points that are at a greater distance than those network access points accessible via the wireless access circuitry when in low power mode.

In one particular embodiment, the functional circuitry 112 may include a rechargeable power element, such as a battery or a large capacitor. When in high power consumption mode, the functional circuitry 112 may permit the recharging of the rechargeable power element. In lower power consumption configurations, the functional circuitry 112 may prevent recharging of the rechargeable power element or may draw power from the rechargeable power element to compensate for power usage not provided via the USB interface.

When the client device 104 is coupled to the USB network, the client device 104 causes a change in the voltage within the USB network, such as in the host device 102 or at a hub device, indicating the presence of the client device 104. When directly connected to the host device 102, the host device 102 recognizes the presence of the client device 104 and requests configuration data. When the client device 104 is connected to a hub (not shown), the hub recognizes the presence of the client device 104. Periodically the host device 102 accesses the hub device to determine whether a client device 104 is present and sends a request to the client device 104 to acquire a set of configuration data.

The set of configuration data typically includes a parameter indicating the preferred power setting of the client device 104. In one particular embodiment, the client device 104 may provide the set of configuration data that includes configurations associated with different functional elements, such as the functional circuitry 112 within the client device 104. Based on the USB specifications, the client device 104 is limited to a maximum power usage of 500 ma.

However, the host device 102 is limited in its permissible power output based on the USB specifications. Similarly, powered hub devices (not shown) are also limited in their permitted power output. When the client device 104 requests a power usage that exceeds the available power based on the limits provided in the USB specification, the host device 102 or a hub (not shown) may suspend the client device 104. In one exemplary embodiment, the host device 102 sends a suspend signal to the client device 104, preventing the client device 104 from accessing the USB network.

In response to the suspend signal, the client device 104 may cause the transceiver 108 to electrically disconnect from the USB media 106. This electrical disconnection may not be a complete physical disconnection from the USB compatible media 106. Instead, the electrical disconnection of the transceiver 108 results in a change in voltage signals within the USB network recognized by the host 102 or a hub (not shown) as a disconnection of a client device 104.

The transceiver 108 may be electrically reconnected, indicating to the host 102 or a hub device (not shown) that a new client device 104 is connected to the USB network. The client device 104 may send a second set of configuration data to the host 102 upon receiving a request from the host 102. For example, the USB interface 110 may include a configuration flag indicating a particular set of configuration data that is to be sent to the host device 102 in response to a request received from the host device 102. When first connected to a USB network, the configuration flag may indicate that a first set of configuration data is to be sent in response to a request. Upon receiving a suspend signal, the interface 110 may adjust the configuration flag to indicate that a second set of configuration data is to be sent in response to a subsequent request. Once the transceiver 108 is reconnected, the client device 104 and, in particular embodiments, the USB interface 110, may access the configuration flag to determine that the second configuration data indicating a second power profile is to be transferred to the host device 102 in response to subsequent requests.

Based on the configuration data that is accepted by the host device 102, the functional circuitry 112 may be placed in a mode compatible with that configuration. For example, when the host device 102 accepts a first configuration, the functional circuitry 112 may operate in a first mode. However, when the host device 102 sends a suspend signal to the client device 104, the configuration flag may be changed, the transceiver 108 may electrically disconnect and reconnect to the USB network and the second configuration data may be forwarded to the host device 102 in response to subsequent requests. As a result, the functional circuitry 112 may operate in the second mode. In particular embodiments, the first configuration is a higher power configuration than a second configuration. In one particular embodiment, the second configuration includes a low power configuration, such as a power configuration using not more than 100 ma.

While the system 100 is shown with a host device 102, a USB media 106, such as a cable, and a client device 104 connected to the USB media 106, the client device 104 may be configured with a USB connector, such as a USB plug or receptor, that couples directly to the host 102 or to a hub (not shown).

Figure 2:
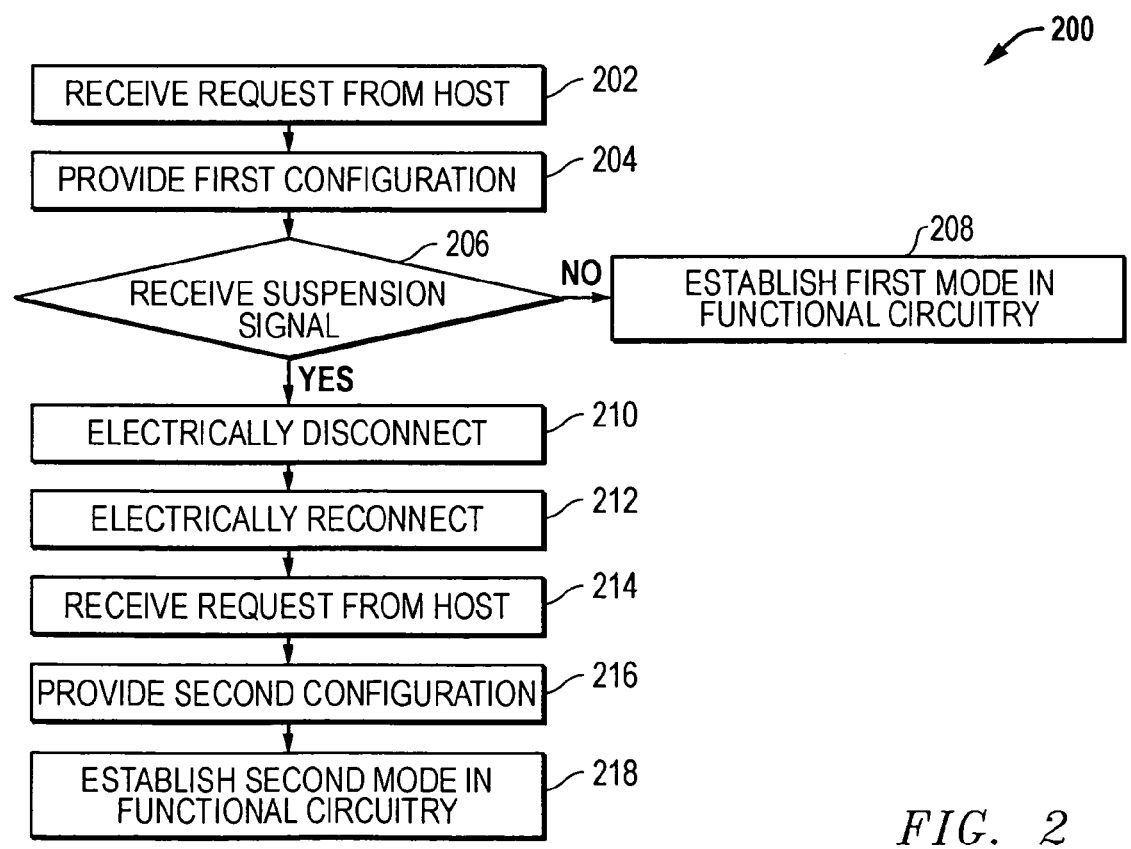
FIG. 2 includes an illustration of an exemplary method of use by a computational system, such as the exemplary computational system of FIG. 1.

FIG. 2 includes an illustration of an exemplary method 200 for establishing a communication link between a client device and a host device. Upon connection of the client device with the universal serial bus network, a host device may recognize the presence of a client device. In the illustrated method 200, the client device receives a request from the host device for configuration data, as shown at step 202. The client device provides first configuration data having a parameter with a first parameter value, as shown at 204. In one particular embodiment, the parameter is associated with a power setting.

The host device may determine whether it is permissible to establish a communication link with the client device and based on that determination the host may or may not send a suspend signal. When the client device does not receive a suspend signal, as illustrated at 206, the client device may establish a first mode in the functional circuitry, as illustrated at 208. For example, the host device may determine that communication with the client device is permissible and may establish a network address and network settings with the client device.

Alternatively, the host device may determine that the power consumption of the client device exceeds available power within the USB network. In this case, the host device may send a suspend signal to the client device when there is insufficient power to operate the client device or meet the client device configuration. When a suspension signal is received, as illustrated at 206, the client device may electrically disconnect from the USB network, as illustrated at 210.

For example, the client device may cause a transceiver to electrically disconnect from the network, indicating to the network that the client device has been removed. In one embodiment, the device remains in physical contact with the network, such as coupled to network media, the host device, or a hub device. Electrically disconnecting the transceiver results in an electric signal to a host device or hub indicating that the client device is no longer accessible via the network.

In one particular embodiment, when the suspension signal is received, a configuration flag may be changed in an interface in the client device to indicate that upon subsequent reconnections or in response to subsequent requests from a host device, second configuration data is to be sent. This configuration flag may also influence or direct the mode in which functional circuitry of the client device is to operate.

The client device may electrically reconnect to the network, as illustrated at 212. Electrically reconnecting results in an electric signal interpreted by a hub device or the host device as a physical reconnection of a client device, indicating availability of the client device for access via the network.

Upon electrically reconnecting to the network, a host may recognize the presence of the client device and request configuration data. The client device receives the request from the host, as illustrated at 214, and provides second configuration data, as illustrated at 216. The second configuration data may include the parameter having a second parameter value. For example, when the parameter is associated with a power setting, the second parameter value may indicate a lower power setting than the first parameter value. In one particular embodiment, an interface of the client device accesses a configuration flag, determines that the second configuration data is to be sent to the host device in response to a request and provides the second configuration data to the host device. In one particular embodiment, the second configuration data indicates a power setting representing consumption of 100 ma, the power setting that is defined to be available in compliance with the USB specification, The functional circuitry of the client device may operate in a second mode, as illustrated at 218, in response to providing the second configuration data. For example, the configuration flag may be accessed to determine the mode of the functional circuitry. When the configuration flag indicates that the second configuration data is to be provided in response to a host request, the functional circuitry may be placed in a second mode of operation that is compatible with the second configuration data.

For example, for a wireless network access device, the functional circuitry may be placed in high power mode when a first configuration is accepted and a low power mode when a second configuration is accepted by a host device. In another example, a rechargeable battery may be recharged when a first configuration is accepted and may be prevented from recharging or may be used as a power source when a second configuration is accepted by a host device. In one particular embodiment, a portable audio player may recharge a battery when a first configuration is accepted and may also allow data transfer and program updates when the first configuration is accepted.

In alternative embodiments, the host may send further suspend signals and third configuration data may be provided based on disconnecting and reconnecting the client device transceiver.

Particular embodiments of the above disclosed client device permit client side negotiation of universal serial bus settings. In certain conventional USB devices, the host device is configured to determine the permissible settings associated with client side access to the universal serial bus network. For example, in certain USB systems, the host device determines, based on the client provided configuration data, whether the client device may access the network and suspends the client device from accessing the network when power usage is in excess of available power. In contrast, particular embodiments of the client device as disclosed herein provide multimodal functionality and the client device may determine a particular configuration and functionality that meets the available power as provided by the network.

The above-disclosed subject matter is to be considered illustrative, and not restrictive, and the appended claims are intended to cover all such modifications, enhancements, and other embodiments that fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method for establishing a universal-serial-bus (USB) connection, the method comprising:
   electrically connecting a USB client device to a USB-compatible medium;
   receiving, at the USB client device, a first request for configuration data from a USB host device;
   providing a first set of configuration data to the USB host device in response to receiving the first request for configuration data;
   receiving, at the USB client device, a suspend signal from the USB host device;
   electrically disconnecting the USB client device from the USB-compatible medium in response to receiving the suspend signal;
   electrically reconnecting the USB client device to the USB-compatible medium;
   receiving, at the USB client device, a second request for configuration data from the USB host device; and
   providing a second set of configuration data to the USB host device in response to receiving the second request for configuration data.

2. The method of claim 1, wherein the USB client device comprises a portable audio player.

3. The method of claim 1, wherein the USB client device comprises a portable video player.

4. The method of claim 1, wherein the first set of configuration data includes a parameter having a first parameter value, and wherein the second set of configuration data includes the parameter having a second parameter value.

5. The method of claim 4, wherein the parameter is associated with a power setting of the USB client device.

6. The method of claim 1, wherein the first set of configuration data indicates a first power profile of the USB client device and the second set of configuration data indicates a second power profile of the USB client device.

7. The method of claim 1, further comprising:
   receiving, at the USB client device, a second suspend signal from the USB host device;
   electrically disconnecting the USB client device from the USB-compatible medium in response to the second suspend signal;
   electrically reconnecting the USB client device to the USB-compatible medium after receiving the second suspend signal;
   receiving, at the USB client device, a third request for configuration data from the USB host device; and
   providing a third set of configuration data to the USB host device in response to receiving the third request for configuration data.

8. A universal-serial-bus (USB) client device comprising:
   a USB transceiver configured to couple to a USB-compatible medium and configured to electrically disconnect from and electrically reconnect to the USB-compatible medium in response to a suspend signal received from a USB host device;
   a transceiver interface operable to access a plurality of sets of configuration data, the plurality of sets of configuration data including at least a first set of configuration data and a second set of configuration data, wherein the transceiver interface is configured to provide the first set of configuration data to the USB host device via the USB transceiver and wherein the transceiver interface is configured to provide the second set of configuration data to the USB host device via the USB transceiver after the USB transceiver electrically reconnects to the USB-compatible medium; and
   functional circuitry coupled to the transceiver interface to communicate via the USB transceiver and configured to provide USB-device functionality.

9. The USB client device of claim 8, wherein the functional circuitry is configured to operate in a first mode when the first set of configuration data is provided to the USB host device and to operate in a second mode when the second set of configuration data is provided to the USB host device.

10. The USB client device of claim 9, wherein the first mode indicates a first power consumption profile of the functional circuitry and the second mode indicates a second power consumption profile of the functional circuitry and wherein the first mode is associated with a higher power consumption than the second mode.

11. The USB client device of claim 10, wherein the functional circuitry provides a plurality of features when operating in the first mode and wherein the functional circuitry provides fewer features when operating in the second mode.

12. The USB client device of claim 10, wherein the functional circuitry provides wireless network access and wherein the functional circuitry, when operating in the first mode, provides access to network access points that are at a greater distance from the USB client device than network access points accessible when the functional circuitry is operating in the second mode.

13. The USB client device of claim 10, wherein the functional circuitry includes a rechargeable power element.

14. The USB client device of claim 13, wherein the rechargeable power element is recharged when the functional circuitry is operating in the first mode and wherein the rechargeable power element is not recharged when the functional circuitry is operating in the second mode.

15. The USB client device of claim 10, wherein the second mode has a power configuration using not more than 100 milliamps.

* * * * *